G. HEELEY.
GAS TIGHT JOINT.
APPLICATION FILED FEB. 21, 1914.

1,291,869.

Patented Jan. 21, 1919.

Witnesses:

Inventor:
George Heeley
By Wm E Boulter
attorney

UNITED STATES PATENT OFFICE.

GEORGE HEELEY, OF PARIS, FRANCE, ASSIGNOR TO COMPAGNIE POUR LA FABRICATION DES COMPTEURS, ET MATERIEL D'USINES À GAZ, OF PARIS, FRANCE.

GAS-TIGHT JOINT.

1,291,869.   Specification of Letters Patent.   Patented Jan. 21, 1919.

Application filed February 21, 1914. Serial No. 820,294.

*To all whom it may concern:*

Be it known that I, GEORGE HEELEY, a citizen of the Republic of France, residing at Paris, in France, have invented certain new and useful Gas-Tight Joints, of which the following is a specification.

This invention relates to improvements in gas-tight joints for use in coin-operated fluid meters and other coin-operated distributers.

All constructions of coin-operated meters have (1) apparatus operated both by the measuring mechanism of the meter, and by the coins during their passage through the apparatus; and (2) a valve or the like which is opened when coins are introduced in the apparatus, and closed when the amount paid for, is exhausted.

The apparatus is necessarily arranged outside the meter, so as to be within reach of the consumer, while the valve moves in the fluid to be measured.

The parts transmitting to the valve the movement of the measuring mechanism, therefore must pass through an orifice which must be provided with a stuffing box or any other device preventing leakages. But the stuffing box has the drawback of not permanently remaining air-tight, and of increasing the force necessary for moving the valve, owing to the compression that is necessary to render it operative.

Figure 1:
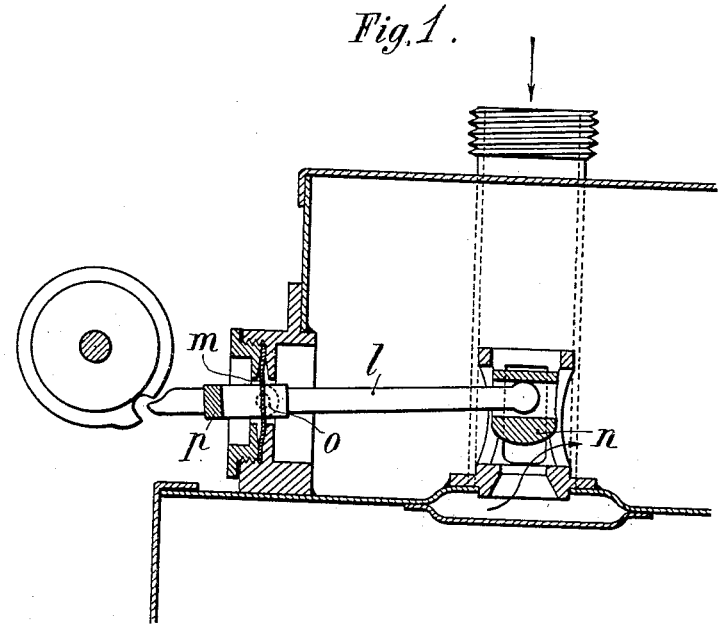
Figure 2:
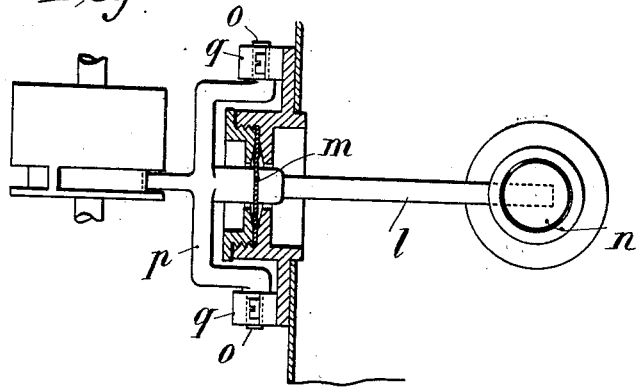

In the accompanying drawing, Figure 1 is a vertical sectional view, partly in elevation, of a portion of a coin-operated gas-meter embodying my improved gas-tight joint. Fig. 2 is a sectional plan view of the construction shown in Fig. 1.

In the construction illustrated, the connection comprises a flexible membrane *m* connected to a lever *l*, one end of which is moved by the coin-operated mechanism. The other end moves the valve *n*. The membrane *m* is clamped both on the circumference of the orifice affording passage to the lever *l* and on an enlarged portion *r* of the latter.

The lever *l* is provided with a cross-bar *p*, the ends *o*, of which form trunnions rotating in bearings *q*, along an axis passing through the plane of the membrane *m*. This arrangement avoids any lateral movement of the lever *l*.

It will be understood that, in these conditions, it is necessary that the lever *l* should oscillate through only a small angle in order to open and close the valve *n*.

The amplitude of the said oscillation can be, moreover, reduced at will, as the said amplitude is in inverse ratio to the distance between the valve and the enlarged portion of the lever.

Thus it is possible to obtain a very long-travel of the valve with a very small angular movement of the lever. It follows that the movement of the membrane and of the enlarged portion is insignificant, and that the membrane itself bends only very slightly, when the lever opens and closes the valve.

As the membrane does not undergo any appreciable deformation, it does not offer any resistance to the movement of the valve, even when it is necessary to increase its thickness or its rigidity in order to give it greater strength and insure its impermeability.

Moreover, it remains indefinitely unchanged in its initial condition, as it is inclosed in the space comprised between two slightly concave-faced elements forming cups that can be filled with a material for lubricating it and insulating it from other contact. It will also be understood that any high pressure or depression in the interior of the meter forces the membrane against the walls of the cups, which are very close to, and form a point of support for the diaphragm for resisting thrusts.

What I claim as my invention and desire to secure by Letters Patent is:—

In a gas-tight joint, the combination with a wall and an oscillating lever comprising two parts connected end to end and passing through the wall, of a gas-tight flexible membrane which is traversed and clamped in its center by the two connected parts of the said lever, an annular socket secured to the wall and surrounding the lever, means for hermetically securing the edge of the membrane in said socket, a transverse cranked bar secured in its center to the said lever, trunnions formed at the ends of the said bar and having their common axis passing through the center of the membrane, bearings in the socket adapted to receive the trunnions, a valve controlling the admission of gas into the meter and actuated by one of the ends of the lever, and means for guiding the said valve.

In testimony whereof I have signed my name to this specification in the presence of two subscribing witnesses.

GEORGE HEELEY.

Witnesses:
CHAS. P. PRESSLY,
GEORGES BONNEUIL.